United States Patent
Kappacher et al.

(10) Patent No.: US 8,613,824 B2
(45) Date of Patent: Dec. 24, 2013

(54) MULTI-LAYER, SUBSTANTIALLY POLYVINYL CHLORIDE- AND POLYOLEFIN-FREE COMPOSITE FILM

(75) Inventors: Johann Kappacher, Piesendorf (AT); Erich Bernsteiner, Piesendorf (AT); Andreas Höllebauer, Wiener Neustadt (AT)

(73) Assignee: Senoplast Klepsch & Co. GmbH, Piesendorf (AT)

( * ) Notice: Subject to any disclaimer, the term of this patent is extended or adjusted under 35 U.S.C. 154(b) by 393 days.

(21) Appl. No.: 12/961,036

(22) Filed: Dec. 6, 2010

(65) Prior Publication Data

US 2011/0135807 A1    Jun. 9, 2011

Related U.S. Application Data (60) Division of application No. 10/705,016, filed on Nov. 10, 2003, now abandoned, which is a continuation of application No. PCT/AT02/00129, filed on Apr. 25, 2002.

(30) Foreign Application Priority Data

May 10, 2001    (AT) .................................. A 742/2001

(51) Int. Cl.
    *C23C 14/54*    (2006.01)
(52) U.S. Cl.
    USPC ........................................ 156/244.11; 427/9
(58) Field of Classification Search
    USPC ........................................ 156/244.11; 427/9
    See application file for complete search history.

(56) References Cited

U.S. PATENT DOCUMENTS

| | | | |
|---|---|---|---|
| 4,293,603 A * | 10/1981 | Hayman-Chaffey et al. ... | 428/86 |
| 4,684,568 A * | 8/1987 | Lou ................................ | 442/76 |
| 5,061,558 A * | 10/1991 | Fischer et al. ................ | 428/332 |
| 5,549,941 A | 8/1996 | Banyay et al. | |
| 6,096,410 A * | 8/2000 | Okajima et al. ........... | 428/195.1 |
| 6,183,842 B1 | 2/2001 | Shimizu et al. | |
| 6,274,219 B1 * | 8/2001 | Schuster et al. ............. | 428/138 |
| 6,333,094 B1 | 12/2001 | Schneider et al. | |
| 6,777,089 B1 | 8/2004 | Koniger et al. | |
| 6,861,128 B1 * | 3/2005 | Muller et al. ................. | 428/215 |

(Continued)

FOREIGN PATENT DOCUMENTS

| | | |
|---|---|---|
| DE | 27 30 899 | 7/1977 |
| DE | 2730899 A * | 2/1979 |

(Continued)

OTHER PUBLICATIONS

International Search Report issued Aug. 7, 2002 in International (PCT) Application No. PCT/AT02/00129.

*Primary Examiner* — Philip Tucker
*Assistant Examiner* — Vicki Wu
(74) *Attorney, Agent, or Firm* — Wenderoth, Lind & Ponack, L.L.P.

(57) ABSTRACT

The invention relates to a multilayer composite film which is substantially free from polyvinyl chloride and polyolefins. In particular, the layers of the film may include an ABS material, a polystyrene material, and/or a polyester material. The material composition and thickness of composite film are such that the maximum tensile force generated when a test body including the composite film is subjected to a specified single-axis tensile testing procedure ranges between 30 Newtons and 280 Newtons.

37 Claims, 2 Drawing Sheets

(56) References Cited

U.S. PATENT DOCUMENTS

| | | |
|---|---|---|
| 2001/0008700 A1 | 7/2001 | Jonza |
| 2002/0150775 A1 * | 10/2002 | Ishikawa et al. .............. 428/458 |
| 2006/0269723 A1 | 11/2006 | Kager et al. |
| 2010/0318055 A1 * | 12/2010 | Hornung et al. ......... 604/385.31 |

FOREIGN PATENT DOCUMENTS

| | | |
|---|---|---|
| DE | 37 09 229 | 9/1988 |
| DE | 39 05 790 | 9/1990 |
| DE | 42 14 192 | 11/1993 |
| DE | 198 58 173 | 6/2000 |
| DE | 200 22 048 | 3/2001 |
| EP | 0 283 861 | 3/1988 |
| EP | 283861 A2 * | 9/1988 |
| EP | 0 704 482 | 7/1995 |
| EP | 0 781 201 | 8/1995 |
| EP | 803351 A1 * | 10/1997 |
| EP | 0 875 374 | 4/1998 |
| EP | 0 987 102 | 8/1999 |
| GB | 1267469 A * | 3/1972 |
| GB | 2344596 | 6/2000 |
| JP | 8-311301 | 11/1996 |
| JP | 2000-233480 | 8/2000 |
| WO | 00/24577 | 5/2000 |
| WO | 00/63015 | 10/2000 |

* cited by examiner

MULTI-LAYER, SUBSTANTIALLY POLYVINYL CHLORIDE- AND POLYOLEFIN-FREE COMPOSITE FILM

This application is a divisional application of application Ser. No. 10/705,016, filed Nov. 10, 2003, now abandoned which is a continuation application of International Application No. PCT/AT02/00129, filed Apr. 25, 2002.

BACKGROUND OF THE INVENTION

The present invention concerns a multi-layer, substantially polyvinyl chloride and polyolefin-free composite film, in particular furniture film, including at least one carrier layer which has ABS (acrylonitrile butadiene styrene), in particular ABS with admixtures; and/or polystyrene; in particular polystyrene with admixtures and/or high-impact polystyrene, and/or polyester, in particular amorphous polyester copolymer.

When using thermoplastic decorative films in the furniture sector, particularly when high-shine surfaces are involved, high demands are made in terms of scratch resistance, abrasion resistance, chemical resistance, tension tearing resistance and optical values such as shine, long- and short-wave factors as well as surface fine roughness. Environmental awareness is also increasingly advancing into the furniture sector, so that demands are also additionally being made in terms of the material nature of the thermoplastic films. The materials and processes used at the present time do not always satisfy those conditions.

Furniture films of thermoplastic materials are produced for example by laminating/coating a thin scratch-resistant layer on to a pigmented polyvinyl chloride (PVC) carrier film and subsequently applying a primer layer at the rear side. Admittedly, PVC carrier films substantially satisfy all physical and optical requirements of furniture films, but, on the other hand, nowadays they are considered ecologically questionable. A more ecologically advantageous variant was marketed, using a base film of pigmented amorphous polyester copolymer, instead of the pigmented PVC base film, has been marketed. Further alternatives on a polyolefinic carrier basis are described in EP 0 987 102 A2, which discloses a base of polyethylene, a scratch-resistant coating, and also an overlay film of transparent amorphous polyester copolymer. In addition, EP 0 704 482 B1 discloses a plurality of structures in which polyolefins are homogenised with polymers of other chemical classes (styrene copolymers, polymethacrylates) and processed to constitute films for furniture and articles of furniture. EP 0 875 374 A2 describes a product for which a carrier film including polyolefins, ABS (acrylonitrile-butadiene-styrene copolymers), ASA (acrylonitrile-styrene-acrylic ester copolymers), AES (thermoplastic quadrupolymer of acrylonitrile-ethylene-propylene-styrene), PET (polyethylene terephthalate), or an amorphous polyester is laminated with an overlay film of an amorphous polyester. Japanese specification No 08311301 A describes an ABS film to which a defined addition of polycaprolactone is added as a processing aid for the calendering process. The ABS film may also contain between 5 and 50 percent by weight of methacrylate raw material.

Co-extruded panels of polymethylmethacrylate (PMMA) and ABS are also known as high-shine film materials. Furniture films are produced in that case by co-extrusion with a wide-slot nozzle. An alternative form of processing involves thermoshaping of the films and subsequently adhering the film to wood fibre panels. A further alternative form of processing involves glueing on to flat surfaces and hot edging. In general terms, thermoplastic, high-shine furniture films and mats are processed by pressing, laminating, or shaping on wood or foam cores. In order to be able to process the films on existing machines, the films must satisfy defined technical conditions. In particular, the films must have, interalia, good thermoshapability at low temperatures (100° C.) and a corresponding processing window of between 90° and 120° C. In addition, the films should have improved surface properties (shine, long wave, short wave, UV (ultraviolet light) resistance, scratch resistance, chemical resistance) as well as good adhesion to wood materials, pieces of wood, or foam cores. Those demands are only partially or not at all fulfilled by the PVC-free films in the art, which are desired from an ecological point of view.

BRIEF SUMMARY OF THE INVENTION

Therefore, the objective of the present invention is to provide a composite film with defined surface qualities which is an ecologically appropriate alternative to the PVC films prevalent in the art, and also satisfies the above-specified technical requirements.

In accordance with the invention that objective is achieved in that, in the single-axis tensile testing of a test body comprising the composite film, a maximum tensile force of between 30 Newtons and 280 Newtons occurs, when the single-axis tensile testing procedure satisfies the following testing specification:

a) a test body in accordance with type 1 B of ISO 527-2: 1996 (incorporated by reference) Section 6 with a thickness corresponding to the thickness of the composite film to be tested is stored prior to the beginning of the test for 24 hours at 23° C. and 50% relative air humidity;

b) the previously stored test body is clamped into a testing apparatus in accordance with ISO 527-1: 1996 (incorporated by reference) Section 5 such that the longitudinal axis of the test body is parallel to the composite film extrusion or calendering direction; prestressing is applied in accordance with ISO 527-1: 1996 Sections 92 and 9.5;

c) the single-axis tensile test is subsequently implemented in accordance with ISO 527-1: 1996 at a constant testing speed of 800 mm/min and at a constant temperature of 80° C., wherein immediately prior to the beginning of the tensile test the clamped test body remains in a climatic chamber, temperature-controlled at 80° C. for a period of 10 minutes, and d) during the tensile test the tensile forces which occur are recorded depending on the test time from the beginning of the testing procedure in a range of nominal stretch $\epsilon_t$ (in accordance with ISO 527-1: 1996 Section 10.2) of between 0% and 100%.

Besides the above-specified surface properties, it is particularly important that the composite films of the present invention satisfy the thermoshapability criteria in the above-stated temperature ranges. Thermoshapability of the composite films is an aspect of central significance for the subsequent use thereof in the furniture industry. Thermoshapability refers to the ability of the composite films, with processes in accordance with the state of the art, to be precisely matched to the surface configuration of the item of furniture to be coated. Critical locations when applying such composite films are corners, edges, recesses and so forth. In that respect, it is crucial that the composite films can also be adapted as exactly as possible to small corners, radii and edges.

It has been found in accordance with the invention that those films which satisfy a single-axis tensile testing procedure as is set forth above have the required properties in respect of thermoshapability. It is important that the test body is not pre-loaded prior to executing the above-described tensile testing procedure.

In the preferred embodiments it is provided that the carrier layer of the composite film is of a thickness of between 100 and 1000 μm. Composite films according to the invention in that range of thicknesses can be well processed. In addition, they have the thickness necessary in regard to the quality requirements.

Particularly advantageous alternative configurations of the composite films provide that they have at least one carrier layer with amorphous polyester copolymer, wherein, in the single-axis tensile testing of such a composite film, a maximum tensile force of between 50 Newtons and 120 Newtons, preferably between 65 Newtons and 105 Newtons, occurs. It is advantageous with those films for the film to be of a thickness of between 200 and 600 μm, preferably between 300 and 450 μm. Another advantageous group of composite films provides that they have at least one carrier layer with ABS and/or polystyrene, preferably HIPS (high impact polystyrene), wherein in the single-axis tensile testing of such a composite film a maximum tensile force of between 50 Newtons and 230 Newtons, preferably between 105 Newtons and 230 Newtons, occurs. It is particularly desirable in that respect that, in the tensile testing of such a composite film, a maximum tensile force of between 105 Newtons and 180 Newtons occurs. In addition, it is provided that those composite films are of a thickness of between 400 and 1000 μm, preferably between 600 and 800 μm.

Particularly preferred variants of the composite film have at least one carrier layer of ABS, in particular in ABS with admixtures and/or polystyrene, in particular polystyrene with admixtures and/or high impact polystyrene, and/or polyesters, in particular amorphous polyester copolymer. It is provided in that respect that the composite film, under a cover layer, has a single-layer extrudate or a co-extrudate including at least two sub-layers, as the carrier layer. That represents a basic structure of the films according to the invention, which particularly well enjoys the properties required in the above-described test.

Preferred embodiments provide that at least one carrier layer of the composite film have UV-stabilizers and/or UV-absorbers and/or pigments, preferably for coloration purposes, and in a proportion by volume of between 0.1 and 10%. By virtue of that addition, the film attains its desired optical properties and also retains them even if it is exposed to sunlight over many years.

Preferred embodiments further provide that the carrier layer and/or at least one sub-layer of the carrier layer have additives for Vicat reduction, with a proportion by weight of between 1 and 70%. A variant provides that the carrier layer and/or at least one sub-layer of the carrier layer have polycaprolactone with a proportion by weight of between 0.5 and 15%. A further variant provides that the carrier layer and/or at least one sub-layer of the carrier layer have amorphous polyester copolymer with a proportion by weight of between 30 and 70%. Those additives serve in particular to provide the composite film with superior physical properties.

In the case of a multilayer and preferably a double-layer structure of the coextrudate of the carrier layer a preferred embodiment provides that in at least one sub-layer—preferably facing away from the cover layer—the carrier layer has recycled material from the ongoing production process.

A primer layer can be applied to the side of the carrier layer, which is in opposite relationship to the cover layer of the composite film. The primer layer serves to connect the composite film to the body to which it is applied.

Preferred embodiments provide that, in the case of its single-layer structure, the carrier layer is of a thickness of between 94 and 98% of the overall thickness of the composite film.

Furthermore, preferred embodiments provide that the cover layer of the composite film is co-extruded together with the carrier layer and has PMMA or impact-resistant modified PMMA. A selected group of composite films according to the invention provides that the composite film is of an overall thickness of between 500 and 1000 μm, preferably between 500 and 800 μm. In addition it is provided in selected embodiments that the cover layer of the composite film is of a layer thickness of between 1 and 5%, preferably in the range of between 3 and 4%, of the overall thickness of the composite film.

In addition it is provided in selected embodiments that, in the case of a double-layer carrier layer, the first sub-layer thereof is of a thickness of between 5 and 20%, preferably between 10 and 15%, of the overall thickness of the composite film, and the second sub-layer of the carrier layer is of a thickness of between 74 and 93%, preferably between 75 and 85%, of the overall thickness of the composite film.

Other embodiments provide that, as the cover layer, a transparent scratch-resistant coating is laminated on to the carrier layer or applied by thermal transfer printing. In regard to this group of the composite films, it is provided that the composite film is of an overall thickness of between 200 and 600 μm, preferably between 300 and 450 μm. In comparison with the composite films in which the cover layer of the composite film is co-extruded together with the carrier layer in a co-extrusion process, it is possible to achieve a thinner overall thickness for the composite film if the cover layer is applied by lamination.

In these embodiments it is further provided that the cover layer of the composite film is of a layer thickness of between 1 and 5%, preferably between 1 and 3%, of the overall thickness of the composite film.

Preferred embodiments provide in this respect that, in the case of a double-layer carrier layer, the sub-layer thereof is of a thickness of between 20 and 40%, preferably between 25 and 35% of the overall thickness of the composite film and the second sub-layer of the carrier layer is of a thickness of between 60 and 75%, preferably between 65 and 70% of the overall thickness of the composite film.

Other preferred embodiments provide that a transparent scratch-resistant coating is applied to the carrier layer by printing or lacquering, as the cover layer. In that case the composite films are of an overall thickness of between 200 and 600 μm, preferably between 300 and 450 μm. These embodiments further provide that the cover layer of the composite film is of a layer thickness of between 1 and 5%, preferably between 1 and 3%, of the overall thickness of the composite film.

In the case of a double-layer carrier layer of the composite film, selected embodiments provide that the first sub-layer thereof is of a thickness of between 20 and 40%, preferably between 25 and 35%, of the overall thickness of the composite film, and the second sub-layer of the carrier layer is of a thickness of between 60 and 75%, preferably between 65 and 70%, of the overall layer of the composite film.

Another embodiment provides moreover that the carrier layer has an additional co-extruded sub-layer facing towards the primer layer, the additional sub-layer preferably including amorphous polyester copolymer with anti-blocking additive.

Another preferred embodiment provides that the cover layer is of a multi-layer structure and is laminated in the form of a ready pre-product on to the carrier layer. In that respect it is preferably provided that the cover layer has four layers, wherein the first layer is a transparent scratch-resistant coating, preferably with UV-stabilizers and/or UV-absorbers, the second layer is a transparent overlay film comprising amorphous polyester copolymer, preferably with UV-stabilizers and/or UV-absorbers, the third layer is a decorative layer and the fourth layer is a primer layer. It is provided in these films in accordance with the invention that the composite film is of an overall thickness of between 200 and 600 μm, preferably between 300 and 450 μm. In addition embodiments according to the invention the cover layer is of a thickness of between 30 and 40%, preferably between 33 and 37%, of the overall thickness of the composite film.

Other embodiments according to the invention provide that the side of the carrier layer, which is opposite to the decorative layer, has at least one decorative layer and/or at least one color cover layer and/or at least one primer layer, wherein preferably the cover layer has a transparent scratch-resistant coating with UV-stabilizers and/or UV-absorbers. It is provided in those preferred embodiments that the co-extruded carrier layer is at least 80% and preferably 95% of the overall thickness of the composite film. In addition it is provided in preferred embodiments that a first sub-layer of the carrier layer is chemically and/or mechanically matted.

Further embodiments provide that the carrier layer is transparent. Preferred embodiments further provide that the decorative and/or color cover layer or layers is or are applied to the carrier layer using copper intaglio printing and/or flexographic printing and/or screen printing and/or offset printing. By virtue of the application of the decorative layers or color cover layers on the side of the carrier layer, which after application of the composite film to the article of furniture faces towards the article of furniture, the decorative or color cover layers is or are particularly well protected by the carrier layer from abrasion and damage in use of the article of furniture.

Further features and details of the present invention will be apparent from the specific description hereinafter.

DETAILED DESCRIPTION OF THE INVENTION

Figure 1:
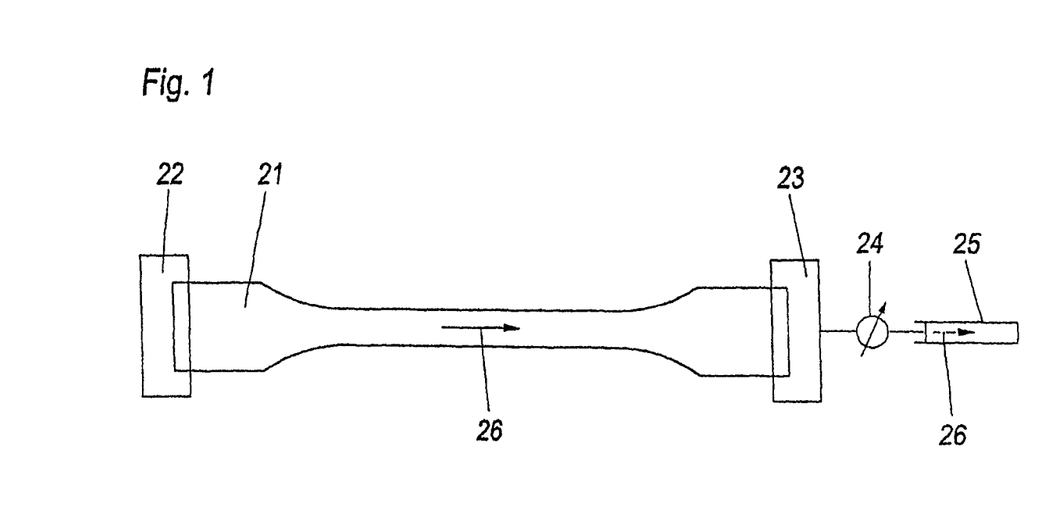
FIG. 1 is a diagrammatic view relating to the testing process for composite films according to the invention.

The testing process diagrammatically shown in FIG. 1 serves to determine the deformation characteristics of co-extruded composite films in a single-axis tensile testing procedure for determining the deformability of those films, for example, on diaphragm pressing installations (a type of installation often used in the processing of composite films).

In accordance with the invention a tensile testing operation is performed in accordance with ISO 527-1: 1996 at a defined testing temperature at a constant testing speed. In this respect, the variation in the testing tensile force which is necessary to maintain the constant testing speed throughout the entire duration of the testing procedure is recorded in dependence on the testing time. The maximum tensile force which occurs during the tensile testing procedure serves as a criterion in regard to the deformability of the films on diaphragm pressing installations.

FIG. 1 diagrammatically shows the test body 21 which is clamped between the gripping clamps 22 and 23 and pulled in the direction 26 at a constant speed with a pulling device 25 and, thereby, stretched. The tensile forces which occur in that case at the test body are recorded by means of a force measuring device 24 in dependence on time. The nominal stretch is measured by suitable means (not shown here) in accordance with ISO 527-1: 1996.

The testing apparatus which is used for the deformation tests must satisfy the conditions defined in ISO 527-1: 1996 Section 5.

A test body of type 1B in accordance with ISO 527-2: 1996 Section 6 is used for the tensile testing operations. The removal of the test bodies from the composite film to be tested should be performed in such a way that the longitudinal axis of the test body is parallel to the extrusion direction or calendering direction. The test bodies must be produced by milling of the films by means of a suitable milling template. The edges of the milled test bodies must be free from tears or milling burrs. If necessary, the milled test bodies must be fine-ground at the edges while still in the template by means of abrasive paper (international grain size 220).

As a certain scatter in respect of the measurement values is to be expected in any measuring or testing procedure. Tensile testing is to be performed on a plurality of test bodies from one and the same composite film, in which case the arithmetic mean must be in the value range according to the invention, having regard to the standard deviation.

The choice of the number of test bodies is based on ISO 527-1: 1996 Section 7.1, that which requires only one testing direction (parallel to the extrusion direction).

Based on ISO 527-1: 1996 Sections 7.2 and 7.3, test bodies which break in the shoulder region or which stretch out of shape into the shoulder region must be rejected. Test bodies which have slipped out of the gripping clamp or in which an obvious fault has resulted in premature failure also may not be included in the evaluation. Repetition tests with a corresponding number of new test bodies have to be carried out.

Before carrying out the tensile testing operation based on ISO 291 (incorporated by reference) ('Plastic materials normal climates for conditioning and testing'), the test bodies are stored for 24 hours at room temperature (23° C.) and a relative air humidity of 50%.

The test according to the invention is implemented at an elevated temperature, $T_1=80°$ C. Thus, the testing apparatus must be provided with a suitable climate chamber. The test bodies pre-treated as described above are clamped in the testing apparatus and heated for 10 minutes in the climate chamber which is temperature-controlled at 80° C. After the heating period, the tensile testing procedure is started.

The dimensions of the test bodies, the clamping of the test bodies, and the application of the prestressing are in accordance with ISO 527-1: 1996 Sections 9.2 through 9.5.

The tensile testing operation is performed at a testing speed of 800 mm/min, which is constant for the duration of the tensile testing operation.

With this testing method, the tensile force which currently applies at any moment in time is variable and, after application of the constant testing speed, arises out of the resistance to stretch, which is variable in respect of time, of the test body.

The test results are evaluated and represented in accordance with ISO 527-1: 1996 Section 10.

It is possible to use stress-stretch diagrams (see ISO 527-1: 1996 FIG. 1) and also tensile force/stretch diagrams for evaluating the tensile test. The relationship between tensile stress and tensile force can be found from ISO 527-1: 1996 Section 10.1.

The tensile test is evaluated within a stretch range of between 0% and 100%, in that case the nominal stretch $\epsilon_r$ of the test body, as defined in ISO 527-1: 1996 Section 10.2, is used.

The test report may contain all the information set forth in ISO 527-1: 1996 Section 12.

Accordingly, the test bodies which were taken from the films corresponding to this invention must have a maximally occurring tensile force which is at least in the range of between 30 Newtons and 280 Newtons in the above-described tensile test, within a nominal stretch range of between 0 and 100%. A further subdivision of the required tensile force range for specific film types is specified above.

Figure 2:
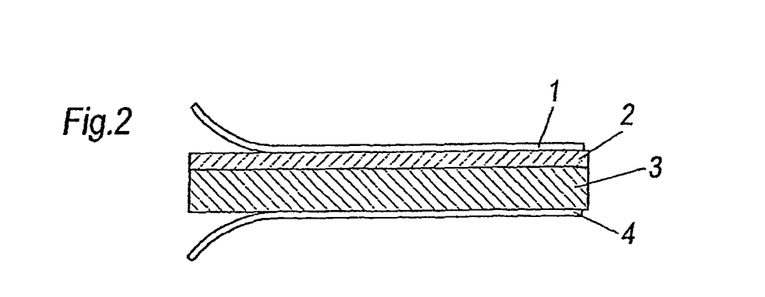
FIGS. 2 through 5 show embodiments according to the invention of various composite films.

FIG. 2 shows a diagrammatic view of the layer structure of the embodiments of the composite film A1 through A7.

The specific layer structure of these embodiments, the percentage thickness proportions of the layers 1 through 4, the additives in the individual layers, and remarks on the layers are set forth below:

A1—Co-Extrudate—Overall Thickness 0.75 mm
  Layer 1—thickness: 4%
    PMMA+preferably 0.1-3% pigments for coloring+UV stabilization preferably comprising UV-stabilizers and/or UV-absorbers
  or: PMMA+UV stabilization
    layer 2—thickness: 15% ABS+0.5-10% pigments for coloring+optionally UV stabilization
  or: ABS+0.5-10% pigments+optionally UV stabilization+optionally additive for Vicat reduction: 10% polycaprolactone or 50% amorphous polyester copolymer
    layer 3—thickness: 80% ABS+0.5-10% pigments for coloring
  or: ABS+0.5-10% pigments+additive for Vicat reduction; 10% polycaprolactone or 50% amorphous polyester copolymer+recycled material from ongoing production process
    layer 4—thickness: 1% primer (applied by printing).
Remarks:
  the layers 2 and 3 are the carrier layers
  the layers 1 through 3 are produced in the co-extrusion process
  layer 1 is the cover layer
  in layer 1 both impact-modified and also standard PMMA can be used
  the layer 2 can be omitted, but is generally produced.

A2—Co-Extrudate—Overall Thickness 0.75 mm
  Layer 1—thickness: 4% PMMA+0.1-3% pigments for coloring+UV stabilization preferably comprising UV-stabilizers and/or UV-absorbers
  or: PMMA+UV stabilization
    layer 2—thickness: 15% HIPS (=high impact polystyrene)+0.5-10% pigments for coloring+optionally UV
  or: HIPS+0.5-10% pigments+optionally UV stabilization+optionally additive for Vicat reduction: 2% polycaprolactone or 50% amorphous polyester copolymer
    layer 3—thickness: 80% HIPS+0.5-10% pigments for colouring+recycled material from the ongoing production process
  or: HIPS+0.5-10% pigments+additive for Vicat reduction; 2% polycaprolactone or 50% amorphous polyester copolymer+recycled material from ongoing production process
    layer 4—thickness: 1% primer (applied by printing).
Remarks:
  the layers 2 and 3 are the carrier layers
  the layers 1 through 3 are produced in the co-extrusion process
  in layer 1, both impact-modified and also standard PMMA can be used
  the layer 2 can be omitted, but is generally produced.

A3—Co-Extrudate—Overall Thickness 0.75 mm
  Layer 1—thickness: 4% PMMA+0.1-3% pigments for coloring+UV stabilization preferably comprising UV-stabilizers and/or UV-absorbers
  or: PMMA+UV stabilization
    layer 2—thickness: 15% amorphous polyester copolymer+0.5-10% pigments for coloring+optionally UV stabilization
    layer 3—thickness: 80% amorphous polyester copolymer+0.5-10% pigments for coloring+recycled material from ongoing production process
    layer 4—thickness: 1% primer (applied by printing).
Remarks:
  the layers 2 and 3 are the carrier layers
  the layers 1 through 3 are produced in the co-extrusion process
  layer 1 is the cover layer
  in layer 1, both impact-modified and also standard PMMA can be used
  the layer 2 can be omitted, but is generally produced.

A4—Laminate—Overall Thickness 0.40 mm
  Layer 1—thickness: 2% Transparent scratch-resistant coating+optionally UV stabilization
    layer 2—thickness: 30% ABS+0.5-10% pigments for coloring+optionally UV stabilization
  or: ABS+0.5-10% pigments+optionally UV stabilization+optionally additive for Vicat reduction: 10% polycaprolactone or 50% amorphous polyester copolymer
    layer 3—thickness: 67% ABS+0.5-10% pigments for coloring
  or: ABS+0.5-10% pigments+additive for Vicat reduction; 10% polycaprolactone or 50% amorphous polyester copolymer+recycled material from ongoing production process
    layer 4—thickness: 1% primer (applied by printing).
Remarks:
  the layer 1 is applied inline or exline by lamination or thermal transfer printing
  the layers 2-3 are produced in the co-extrusion process and are the carrier layers
  the layer 2 can be omitted, but is generally produced.

A5—Laminate—Overall Thickness 0.40 mm
  Layer 1—thickness: 2% Transparent scratch-resistant coating+optionally UV stabilization
    layer 2—thickness: 30% HIPS+0.5-10% pigments for coloring+optionally UV stabilization
  or: HIPS+0.5-10% pigments+optionally UV stabilization+optionally additive for Vicat reduction: 2% polycaprolactone or 50% amorphous polyester copolymer
    layer 3—thickness: 67% HIPS+0.5-10% pigments for coloring
  or: HIPS+0.5-10% pigments+additive for Vicat reduction; 2% polycaprolactone or 50% amorphous polyester copolymer+recycled material from ongoing production process
    layer 4—thickness: 1% primer (applied by printing).
Remarks:
  the layer 1 is applied inline or exline by lamination or thermal transfer printing
  the layers 2-3 are produced in the co-extrusion process and are the carrier layers
  the layer 2 can be omitted, but is generally produced.

A6—Lacquering—Overall Thickness 0.40 mm
  Layer 1—thickness: 2% Transparent scratch-resistant coating+optionally UV stabilization layer 2—thickness: 30% ABS+0.5-10% pigments for coloring+optionally UV stabilization
or: ABS+0.5-10% pigments+optionally UV stabilization, additive for Vicat reduction: 10% polycaprolactone or 50% amorphous polyester copolymer
layer 3—thickness: 67% ABS+0.5-10% pigments for coloring
or: ABS+0.5-10% pigments+additive for Vicat reduction; 10% polycaprolactone or 50% amorphous polyester copolymer+recycled material from ongoing production process
layer 4—thickness: 1% primer (applied by printing).
Remarks:
the layer 1 is applied by printing or lacquering
the layers 2-3 are produced in the co-extrusion process and are the carrier layers
the layer 2 can be omitted, but is generally produced.

A7—Lacquering—Overall Thickness 0.40 mm
Layer 1—thickness: 2% Transparent scratch-resistant coating+optionally UV stabilization
layer 2—thickness: 30% HIPS+0.5-10% pigments for coloring+optionally UV stabilization
or: HIPS+0.5-10% pigments+optionally UV stabilization+ additive for Vicat reduction: 2% polycaprolactone or 50% amorphous polyester copolymer
layer 3—thickness: 67% HIPS+0.5-10% pigments for coloring
or: HIPS+0.5-10% pigments+additive for Vicat reduction; 2% polycaprolactone or 50% amorphous polyester copolymer+recycled material from ongoing production process
layer 4—thickness: 1% primer (applied by printing).
Remarks:
the layer 1 is applied by printing or lacquering
the layers 2-3 are produced in the co-extrusion process and are the carrier layers
the layer 2 can be omitted, but is generally produced.

Figure 3:
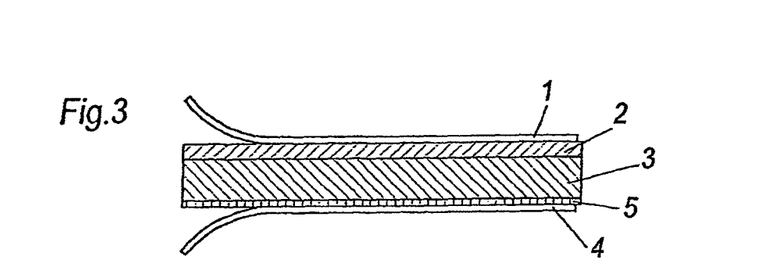

FIG. 3 shows a composite film according to the invention in which the carrier layer is of a triple-layer structure. The precise layer structure is for example as follows:

A8—Laminate—Overall Thickness 0.40 mm
Layer 1—thickness: 2% Transparent scratch-resistant coating+optionally UV stabilization (preferably comprising UV-stabilizers and/or UV-absorber)
layer 2—thickness: 10% amorphous polyester copolymer+0.5-10% pigments for coloring+optionally UV stabilisation (preferably comprising UV-stabilizers and/or UV absorber)+optionally anti-blocking additive
layer 3—thickness: 85% amorphous polyester copolymer+0.5-10% pigments for coloring+recycled material from ongoing production process
layer 5—thickness: 2% amorphous polyester copolymer+ anti-blocking additive
layer 4—thickness: 1% primer (applied by printing).
Remarks:
the layer 1 is applied inline or exline by lamination or thermal transfer printing.
the layers 2, 3, and 5 are produced in the co-extrusion process and are the carrier layers.

Figure 4:
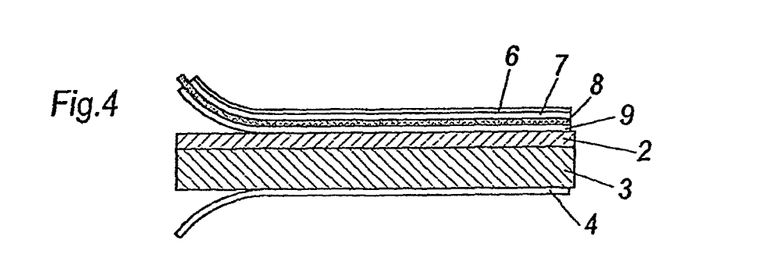

FIG. 4 shows the structure if a composite film according to the invention in which the cover layer is of a multi-layer structure. The precise layer structure is for example as follows:

A9—Laminate—Overall Thickness 0.40 mm
Layer 6—thickness: 2% Transparent scratch-resistant coating+optionally UV stabilization
layer 7—thickness: 30% transparent overlay film comprising amorphous polyester copolymer+optionally UV-stabilization
layer 8—thickness: 1% decorative layer.
layer 9—thickness: 1% primer (applied by printing)
layer 2—thickness: 20% HIPS+0.5-10% pigments for coloring+optionally UV stabilization
or: HIPS+0.5-10% pigments+optionally UV stabilization+ additive for Vicat reduction: 2% polycaprolactone or 50% amorphous polyester copolymer
layer 3—thickness: 45% HIPS+0.5-10% pigments for coloring
or: HIPS+0.5-10% pigments+additive for Vicat reduction; 2% polycaprolactone or 50% amorphous polyester copolymer+recycled material from ongoing production process
layer 4—thickness: 1% primer (applied by printing).
Remarks:
the layer 6 is applied by printing or lacquering to the layer 7
the layer 7 can be chemically or mechanically matted, it is produced using an extrusion process
layers 8 and 9 are applied to the layer 7 by copper intaglio, flexographic, screen or offset printing
the layers 2-3 are produced in the co-extrusion process and are the corner layers process and are the carrier layer
the layer 2 can be omitted but is generally produced
the overall structure is afforded by lamination or a pressing operation of the intermediate product of layers 6-9 (=pre-product) with the previously co-extruded intermediate product consisting of the layers 2 and 3
the layer 4 is applied to the overall laminate by printing.

Figure 5:
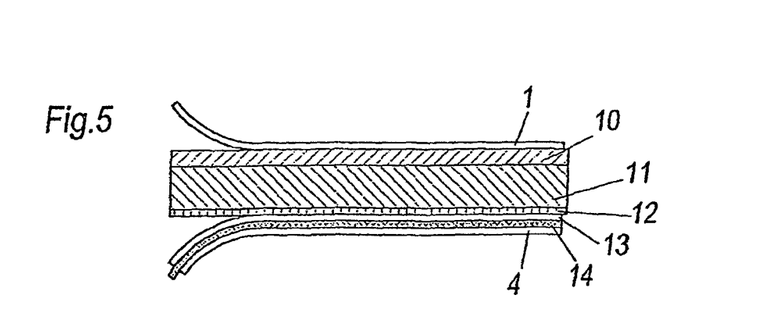

FIG. 5 shows a composite film according to the invention whose main characteristic is that the decorative layers are applied between the carrier layer and the primer layer, under the carrier layer. The precise layer structure in that respect is for example as follows:

A10—Lacquering—Overall Thickness 0.40 mm
Layer 1—thickness: 2% Transparent scratch-resistant coating+optionally UV stabilization (preferably comprising UV-stabilizers and/or UV-absorber); (high shine-matt)
layer 10—thickness: 10% amorphous polyester copolymer+anti-blocking additive+optionally UV stabilization (preferably comprising UV-stabilizers and/or UV-absorber)
layer 11—thickness: 83% amorphous polyester copolymer+recycled material from ongoing production process
layer 12—thickness: 2% amorphous polyester copolymer+anti-blocking additive
layer 13—thickness: 1% decorative layer (for example wood fibre)
layer 14—thickness: 1% colour cover layer (for example wood brown)
layer 4—thickness: 1% primer (applied by printing).
Remarks:
the layer 10 can be chemically or mechanically matted, it is produced using an extrusion process
the layers 10-12 are produced in the co-extrusion process and are the carrier layers
layers 13 and 14 are applied by copper intaglio, flexographic, screen or offset printing.

The materials shown in the various embodiments in FIGS. 2 through 5 involve the following material characteristics:
1. PMMA: Polymethylmethacrylate
impact-resistance modifier content: 0-30% by weight, preferably 0-15%

E-modulus tension in accordance with ISO 527; 1800-3400 MPa, preferably 2500-3300 MPa Vicat softening temperature, ° C., ISO 306 (incorporated by reference) (50° C./h 50N); 90-109° C., preferably 100-109° C.

2. ABS: Acrylonitrile-Butadiene-Styrene Copolymer melt flow rate MFR (ISO 1133 (incorporated by reference) (220° C./10 kg) in g/10 min, between 3.5 and 8, preferably between 4.0 and 6.5

E-modulus tension in accordance with ISO 527; 1400-2300 MPa,

Vicat softening temperature, ° C., ISO 306 (50° C./h 50N); 90-103° C., preferably 99-101° C.

3. HIPS: Polystyrene Impact Modified (High Impact)

melt flow rate MFR (ISO 1133 (220° C./10 kg) in g/10 min, between 3.5 and 6.5—E-modulus tension in accordance with ISO 527; 1100-2100 MPa; —acrylonitrile proportion of 4-12%

Vicat softening temperature, ° C., ISO 306 (50° C./11); 82-93° C., preferably 90-93° C.

4. Amorphous Polyester Copolymer:

E-modulus tension in accordance with ISO 527: 1600-2400 MPa

Vicat softening temperature, ° C., ISO 306: 80-90° C., preferably 85° C.

The invention claimed is:

1. A method of producing a multi-layer composite foil, said method comprising:
    providing a cover layer comprising at least one sub-layer;
    extruding a material including at least one of acrylonitrile butadiene styrene copolymers, acrylonitrile butadiene styrene copolymers with admixtures, polystyrene, polystyrene with admixtures, high-impact polystyrene, polyester, amorphous polyester copolymer so as to form at least two carrier layers;
    arranging the at least two carrier layers under the cover layer to form the composite foil; and
    ensuring that the composite foil has a tensile strength sufficient to achieve a maximum tensile force between 30 Newton and 280 Newton in a single-axis tensile testing procedure using the composite foil as a testing body, wherein said ensuring comprises performing the single-axis tensile testing procedure using the following substeps:
        a) storing the test body according to type 1 B as set forth in ISO 527-2: 1996 Section 6 having a thickness corresponding to a desired thickness of the composite foil to be tested for 24 hours prior to the beginning of the testing at 23° C. and 50% relative air humidity;
        b) clamping the previously-stored test body into a testing apparatus according to ISO 527-1:1996 Section 5, wherein the longitudinal axis of the test body is parallel to the direction of extrusion or calendaring direction of the composite foil, and applying pre-stressing according to ISO 527-1:1996 Section 9.2 and 9.5;
        c) subsequently implementing the single-axis tensile testing procedure according to ISO 527-1:1996 at a constant testing speed of 800 mm/min and at a constant temperature of 80° C., wherein immediately prior to the beginning of said implementing of the single-axis tensile testing procedure, keeping the clamped test body in a climatic chamber temperature-controlled at 80° C. for a period of 10 minutes; and
        d) recording tensile forces which occur during said implementing of the single-axis tensile testing procedure depending on a test time measured from a beginning of the testing procedure in a range of nominal stretch $\epsilon_t$ (according to ISO 527-1:1996 Section 10.2) of between 0% and 100%.

2. The method according to claim 1, wherein the at least two carrier layers have a thickness of between 100 μm and 1000 μm.

3. The method according to claim 1, wherein the carrier layer includes amorphous polyester copolymer, and said ensuring comprises ensuring that the composite film has a tensile strength sufficient to achieve a maximum tensile force of between 65 Newton and 105 Newton using the single-axis tensile testing procedure.

4. The method according to claim 3, wherein the composite foil has a thickness of between 300 μm and 450 μm.

5. The method according to claim 1, wherein the carrier layer includes at least one of acrylonitrile butadiene styrene copolymers, polystyrene, and high impact polystyrene, and said ensuring comprises ensuring that the composite film has a tensile strength sufficient to achieve a maximum tensile force of between 50 Newton and 230 Newton using the single-axis tensile testing procedure.

6. The method according to claim 5, wherein said ensuring comprises ensuring that the composite film has a tensile strength sufficient to achieve a maximum tensile force of between 105 Newton and 180 Newton using the single-axis tensile testing procedure.

7. A method according to claim 5, wherein the composite foil has a thickness of between 600 μm and 800 μm.

8. The method according to claim 1, wherein at least one of the cover layer and the at least two carrier layers is formed to include at least one of UV-stabilizers, UV-absorbers, and pigments in a proportion by volume of between 0.1% and 10%.

9. The method according to claim 1, wherein at least one of the at least two carrier layers includes additives for vicat reduction with a proportion of weight of between 1% and 70%.

10. The method according to claim 1, wherein at least one of the at least two carrier layers includes polycaprolactone in a proportion of weight of between 0.5% and 15%.

11. The method according to claim 1, wherein at least one of the at least two carrier layers includes amorphous polyester copolymer in a proportion of weight of between 30% and 70%.

12. The method according to claim 1, wherein at least one of the at least two carrier layers includes recycled material from the ongoing production process such that the recycled material faces away from the cover layer.

13. The method according to claim 1, further comprising applying a primer layer to a side of the at least two carrier layers located opposite of the cover layer.

14. The method according to claim 1, wherein said providing the cover layer comprises extruding the cover layer together with the at least two carrier layers, and the cover layer includes polymethylmethacrylate or impact-modified polymethylmethacrylate.

15. The method according to claim 1, wherein the composite foil has an overall thickness of between 500 μm and 800 μm.

16. The method according to claim 1, wherein the cover layer has a layer thickness in a range of from 3% and 4% of an overall thickness of the composite foil.

17. The method according to claim 1, wherein a first layer of the at least two carrier layers has a thickness of between 10% and 15% of an overall thickness of the composite foil, and a second layer of the at least two carrier layers has a thickness of between 75% and 85% of the overall thickness of the composite foil.

18. The method according to claim 1, wherein the cover layer is a transparent scratch-resistant coating, and said arranging the at least two carrier layers under the cover layer comprises applying the cover layer to a top one of the at least two carrier layers by laminating the cover layer on the top one of the carrier layers or by thermal transfer printing the cover layer on the top one of the carrier layers.

19. The method according to claim 18, wherein the composite foil has an overall thickness of between 300 μm and 450 μm.

20. The method according to claim 18, wherein the cover layer has a layer thickness of between 1% and 3% of an overall thickness of the composite foil.

21. The method according to claims 18, wherein a first layer of the at least two carrier layers has a thickness of between 25% and 35% of an overall thickness of the composite foil, and a second layer of the at least two carrier layers has a thickness of between 65% and 70% of the overall thickness of the composite foil.

22. The method according to claim 1, wherein the cover layer is a transparent scratch-resistant coating, and said arranging the at least two carrier layers under the cover layer comprises applying the cover layer to a top one of the at least two carrier layers by printing the cover layer on the top one of the carrier layers or by lacquering the cover layer on the top one of the carrier layers.

23. The method according to claim 22, wherein the composite foil has an overall thickness of between 300 μm and 450 μm.

24. The method according to claim 22, wherein the cover layer has a layer thickness of between 1% and 3% of an overall thickness of the composite foil.

25. The method according to claim 22, wherein a first layer of the at least two carrier layers has a thickness of between 25% and 35% of an overall thickness of the composite foil, and a second layer of the at least two carrier layers has a thickness of between 65% and 70% of the overall thickness of the composite foil.

26. The method according to claim 1, further comprising applying a primer layer to a side of the at least two carrier layers located opposite of the cover layer, the at least two carrier layers includes an outer layer facing the primer layer, the outer layer including amorphous polyester copolymer with an anti-blocking additive.

27. The method according to claim 1, wherein the cover layer comprises a plurality of sub-layers, further comprising laminating the cover layer as a finished pre-product onto the at least two carrier layers.

28. The method according to claim 27, wherein the cover layer comprises four sub-layers, wherein the first sub-layer is a transparent scratch-resistant coating with at least one of a UV-stabilizer and a UV-absorber, the second sub-layer is a transparent overlay foil consisting of an amorphous polyester copolymer with at least one of a UV-stabilizer and a UV-absorber, the third sub-layer is a decorative layer, and the fourth sub-layer is a primer layer.

29. The method according to claim 27, wherein the composite foil has an overall thickness of between 300 μm and 450 μm.

30. The method according to claims 27, wherein the cover layer has a thickness of between 33% and 37% of an overall thickness of the composite foil.

31. The method according to claim 1, further comprising applying at least one of a decorative layer, a color cover layer, and a one primer layer, to a side of the at least two carrier layers located opposite the cover layer.

32. The method according to claim 31, wherein the cover layer includes a transparent scratch-resistant coating with at least one of a UV-stabilizer and a UV-absorbers.

33. The method according to claim 31, wherein the at least two carrier layers have a total thickness of at least 95% of an overall thickness of the composite foil.

34. The method according to claim 31, wherein a first layer of the at least two carrier layers is at least one of chemically matted and mechanically matted.

35. The method according to claim 31, further comprising applying at least one of the decorative layer and the color cover layer to the at least two carrier layers by at least one of copper intaglio printing, flexographic printing, screen printing, and offset printing.

36. The method according to claim 31, wherein at least one of the at least two carrier layers is transparent.

37. A method of producing an item of coated furniture, said method comprising:
providing a piece of furniture;
producing a multi-layer composite foil by:
providing a cover layer comprising at least one sub-layer;
extruding a material including at least one of acrylonitrile butadiene styrene copolymers, acrylonitrile butadiene styrene copolymers with admixtures, polystyrene, polystyrene with admixtures, high-impact polystyrene, polyester, amorphous polyester copolymer so as to form at least two carrier layers;
arranging the at least two carrier layers under the cover layer to form the multi-layer composite foil; and
ensuring that the multi-layer composite foil has a tensile strength sufficient to achieve a maximum tensile force between 30 Newton and 280 Newton in a single-axis tensile testing procedure using the composite foil as a testing body, wherein said ensuring comprises performing the single-axis tensile testing procedure using the following sub-steps:
a) storing the test body according to type 1 B as set forth in ISO 527-2: 1996 Section 6 having a thickness corresponding to a desired thickness of the composite foil to be tested for 24 hours prior to the beginning of the testing at 23° C. and 50% relative air humidity;
b) clamping the previously-stored test body into a testing apparatus according to ISO 527-1:1996 Section 5, wherein the longitudinal axis of the test body is parallel to the direction of extrusion or calendaring direction of the composite foil, and applying pre-stressing according to ISO 527-1: 1996 Section 9.2 and 9.5;
c) subsequently implementing the single-axis tensile testing procedure according to ISO 527-1:1996 at a constant testing speed of 800 mm/min and at a constant temperature of 80° C., wherein immediately prior to the beginning of said implementing of the single-axis tensile testing procedure, keeping the clamped test body in a climatic chamber temperature-controlled at 80° C. for a period of 10 minutes; and
d) recording tensile forces which occur during said implementing of the single-axis tensile testing procedure depending on a test time measured from a beginning of the testing procedure in a range of nominal stretch $\epsilon_t$ (according to ISO 527-1:1996 Section 10.2) of between 0% and 100%; and
applying the multi-layer composite foil on to the piece of furniture so as to produce the item of coated furniture, said applying comprising thermoshaping the composite foil around corners, edges, and recesses of the piece of furniture by heating the composite foil.

* * * * *